July 21, 1942.　　K. A. OPLINGER　　2,290,492
SWITCHING APPARATUS
Filed April 5, 1941
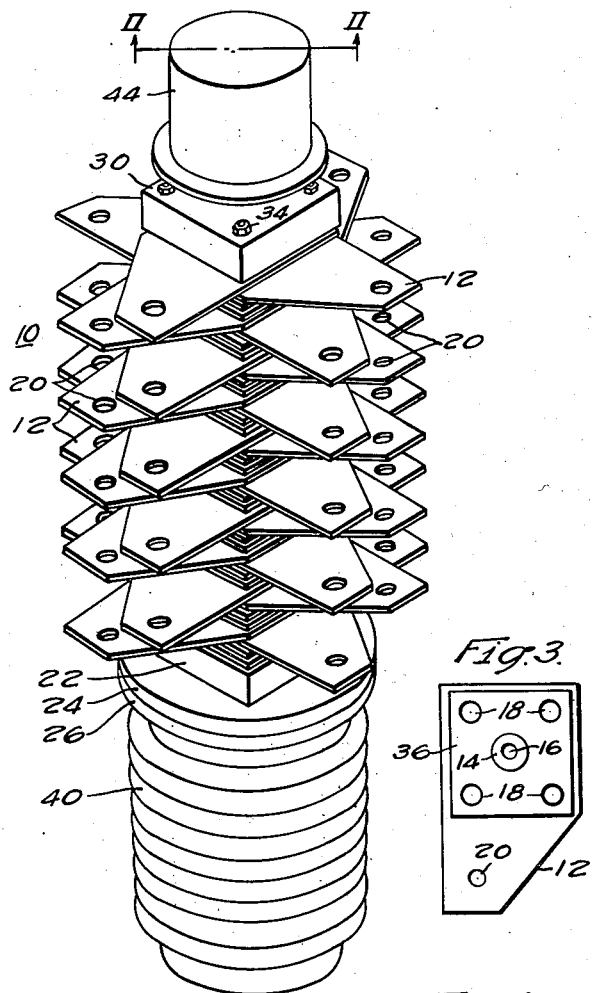
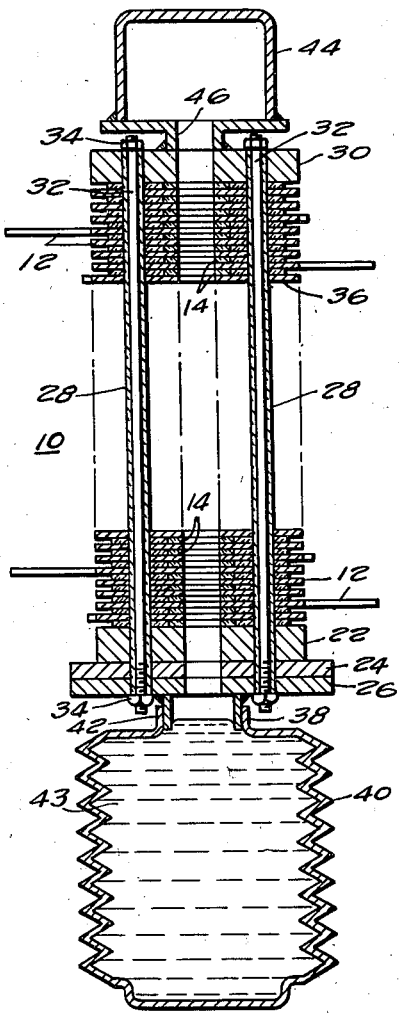
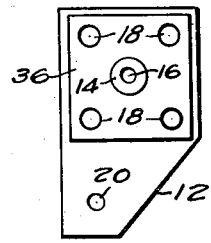
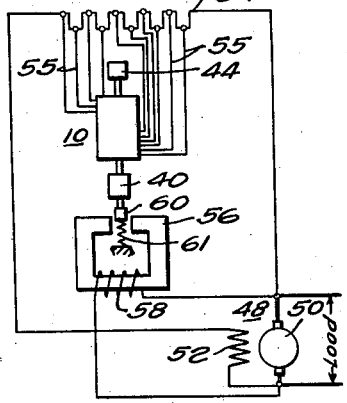
WITNESSES:
E. A. McCloskey
Wm. C. Groome
INVENTOR
Kirk A. Oplinger.
BY James N. Ely
ATTORNEY Patented July 21, 1942

2,290,492

UNITED STATES PATENT OFFICE 2,290,492

SWITCHING APPARATUS

Kirk A. Oplinger, Verona, Pa., assignor to Westinghouse Electric & Manufacturing Company, East Pittsburgh, Pa., a corporation of Pennsylvania Application April 5, 1941, Serial No. 387,097

5 Claims. (Cl. 200—152)

This invention relates to electrical switching apparatus.

The object of this invention is to provide in a switching apparatus a well for the switching fluid made up of contact members and insulating spacer members bonded together with a suitable bonding material.

Another object of this invention is to utilize a plurality of alternately stacked conductor members and spacer members bonded together with a suitable bonding material for providing a well in which a switching fluid is disposed to progressively bridge the contact members.

A more specific object of this invention is to provide in a switching apparatus a well for the switching fluid made up of contact members and insulating spacer members bonded together with glass, the contact members extending outwardly from the well in staggered relation to one another to facilitate the making of electrical connections therewith.

Other objects of this invention will become apparent from the following description, when taken in conjunction with the accompanying drawing in which:

Figure 1 is a view in perspective of the switching apparatus of this invention;

Fig. 2 is a view in section taken along the line II—II of Fig. 1;

Fig. 3 is a plan view of some of the cooperating elements of the switching apparatus embodying the teachings of this invention; and Fig. 4 is a schematic diagram illustrating the use of the switching apparatus of this invention in a regulating system.

Referring to Figs. 1 and 2, there is illustrated a switching apparatus 10 embodying the teachings of this invention. The switching apparatus 10 comprises a plurality of elongated conductor members or leaves 12 and insulating spacer members 14 stacked alternately in assembled relation.

The conductor members 12 may be of any suitable conducting metal or as in a preferred embodiment of this invention are preferably formed of an alloy known to the trade as "Kovar." Kovar is an iron base alloy composed essentially of nickel, cobalt and iron with the nickel plus cobalt content ranging from 40 to 55% of the alloy when the cobalt content ranges from 12 to 33% and the balance substantially iron, as described and claimed in Patent 1,942,260, issued January 2, 1934, to Howard Scott. In the preferred embodiment of this invention the elongated conductor members 12 are substantially rectangular in shape having one side tapered to provide a terminal as shown in Figs. 1 and 3 of the drawing. The members 12 are preferably thin, being of the order of $\frac{1}{32}$ of an inch thick. As illustrated in Fig. 3, each of the leaves or conductor members 12 is provided with a plurality of openings 16, 18 and 20, the purpose of which will be explained more fully hereinafter.

The spacer members 14 may be of any suitable insulating material and in this embodiment are preferably formed of a ceramic insulating material. The ceramic spacer members 14 are provided with a central opening therein of a size corresponding to the opening 16 in the leaf member 12 and have a thickness equal to the spacing factor which it is desired to maintain between the conductor members 12. The central opening of the ceramic spacer members 14 cooperates with the opening 16 in the conductor members 12 when they are stacked alternately therewith to provide a well throughout the stacked assembly.

Referring to Fig. 2, the apparatus of this invention will be described in detail by reference to a method of assembling the component elements thereof. In this figure a base portion formed of a plurality of annular members 22, 24 and 26 each of which has a central opening for cooperating with the well formed by the conductor members 12 and the spacer members 14 and forming an extension thereof are positioned for receiving the conductor members and the spacer members. These annular members are preferably sealed to each other to prevent leaks therebetween or where desired a single solid base member can be employed in place of the three annular members. Each of the annular members also has a plurality of openings 18 therein corresponding to the openings 18 formed in the conductor members 12. With the annular members 22, 24 and 26 thus assembled, a ceramic tubular member 28 is positioned in each of the openings 18 of the base portion and where desired a carbon rod may be positioned in the central opening formed in the base portion. The carbon rod (not illustrated) is provided for aiding in the positioning of the ceramic spacer members with respect to the central opening 16 in the conductor members 12.

With the ceramic tubes 28 in position and the carbon rod (not shown) disposed in the central opening, a ceramic spacer member 14 is positioned about the carbon rod and seated on the annular member 22. A conducting member 12 is then slipped over the ceramic tubes 28 and the carbon rod (not shown) to seat against the ceramic spacer 14 with its tapered end projecting from the stack. Spacer members 14 and conductor members 12 are added to the stack in alternate relation until the desired number of conductor members or leaves are added to the assembly. Referring to Fig. 1, it is seen that as the conductor members 12 are stacked alternately with the spacer members 14, the projecting end of each succeeding conductor leaf member 12 extending outwardly from the stack at a different side, every fifth conductor member being so reversed that the tapered end of no two successive conductor members extending from one side of the stack are in alignment. By positioning the conductor members 12 in this manner, a plurality of staggered terminals are provided for making electrical connections thereto from the electrical apparatus with which it is to be associated. The ceramic tubes 28 and the carbon rod (not shown) thus function in the assembly of the elements as guide members for forming the stack. In all cases the stack begins and ends with one of the ceramic insulating members 14 to insulate the conductor members from the associated terminal plates.

In addition to the spacer members 14 positioned alternately with respect to the conductor members 12, a bonding medium is also disposed between each of the conductor members 12 adjacent each of the spacer members 14. In the particular embodiment of this invention being described, glass is employed as the bonding medium. The glass is usually in the form of a glass washer (not shown) of a size suitable for placing it about the periphery of the spacer member 14.

A preferred glass for this use is a boro-silicate glass having a coefficient of expansion approximating that of Kovar and which readily wets the alloy of the conductor leaves and may be sealed thereto as well as to the ceramic spacer member 14. The glass employed in this embodiment consisted of about 64% by weight of SiO2, about 23% by weight B2O3, about 7% by weight NaO and about 5% by weight Al2O3. Other examples of suitable boro-silicate glass which may be employed in practising this invention and different Kovar alloys which may be employed therewith within the range given hereinbefore and contemplated within the scope of this invention may be readily ascertained by reference to Patent No. 2,062,335, issued December 1, 1936, to Howard Scott. With the stack thus formed having the glass washers (not shown) disposed between adjacent conductor leaves, a top plate 30 having openings therein corresponding to the openings formed in the annular members 22, 24 and 26 is placed upon the stack, the ceramic tubes 28 and carbon rod (not shown) positioning the plate 30 whereby the central opening in the plate will form a continuation of the well formed by the aligned openings in the conductor members 12 and spacing members 14. Suitable elongated bolts 32 are then positioned within the ceramic tube 28, the assembly being clamped into a tight assembly by means of tightening the nuts 34 associated with each of the bolts 32.

In preparing the conductor members 12 for sealing, they are preferably preoxidized at a temperature of about 800° C. for three minutes prior to forming the stacked assembly. With the stack held tightly by means of the bolts 32, the assembly is placed in a heating furnace which has previously been flushed with nitrogen and the furnace temperature is raised to about 1050° C., while maintaining a nitrogen atmosphere. The stacked assembly is held at this temperature for a period of time of about 30 minutes after which it is cooled to approximately 500° C. when hydrogen is admitted. The temperature is then reduced to about 450° C. where it is held for a period of time of one hour to anneal the seal formed by the glass washer having melted and bonded to the conductor members 12 and the ceramic insulating members 14. When the assembly is removed from the furnace, it is found that the glass washer has melted and the glass has flowed as illustrated at 36 in Fig. 3 effectively bonding with the conductor members 12 and the spacer members 14 as well as bonding to each of the ceramic tubes 28. It is further found that the glass also bonds to the top plate 30 and the annular member 22 of the base portion.

After the glass is bonded to the ceramic tubes 28, the tubes 28 cease to function as guide members and are now found to be an integral part of the alternately stacked assembly effectively reenforcing the assembly and rendering it resistant to mechanical shock. The bolts 32 may or may not be retained in the assembly as desired but usually they are left within the ceramic tubes 28 to further reenforce the structure and aid in maintaining the seal between the conductor members and spacer members. The carbon rod is removed from the central opening after the bond is completed.

Referring to Fig. 2, it is seen that the annular member 26 forming the bottom portion of the base is provided with an annular depending flange member 38 positioned about the central opening formed in the plate. A bellows 40 is disposed at the lower end of the stacked assembly and is provided with an annular ring 42 which is sealed by any suitable means such as by a weld or solder to the depending flange member 38 of the plate 26 for forming a receptacle for a liquid conducting material, such as mercury 43.

At the other end of the assembly, a sealed gas chamber 44 having a downwardly projecting flange 46 is so disposed with respect to the central opening in the top plate 30 and welded to the top plate that the flange 46 is in alignment with the well formed in the stacked assembly. In practice, an opening, not shown, is initially provided in the gas chamber for evacuating the sealed well which communicates with both the bellows 40 and the gas chamber 44. After evacuating the well a predetermined amount of mercury is introduced into the bellows 40 and a non-oxidizing gas and preferably a gas such as hydrogen, is introduced into the spacer above the mercury. The gas functions to prevent or reduce arcing between the edges of the spaced conductor leaves forming the wall of the common well. After the gas has been introduced into the gas chamber, the gas chamber is sealed from the atmosphere.

In addition to reducing the arcing between the conductor members, it is found that the gas acts as a cushion on the column of mercury when it is forced through the well by pressure applied externally of the bellows and at times the gas chamber functions to receive the mercury as well as the gas. As will be understood, pressure can be applied to the bellows by any suitable means for forcing the mercury contained within the bellows upwardly through the well to progressively bridge the spaced conductor members in accordance with the amount of pressure applied, it being found that a very slight movement of the bellows is effective for moving the mercury column through the well to progressively contact the conductor leaves.

Referring to Fig. 4, there is illustrated a regulating system which utilizes the switching apparatus of this invention. In this system, a generator 48 is shown, the voltage of which it is desired to maintain constant. The generator 48 may be driven from any suitable source of power, such as a motor (not shown) and comprises the armature windings 50 and the shunt field windings 52. Connected in series with the shunt field winding 52 is a rheostat 54 formed of a plurality of sections disposed to be cut in or shunted from circuit with the field winding 52. In order to control the number of sections of the rheostat 54 which are cut in circuit with the field winding 52, the switching apparatus 10 of this invention is disposed with its staggered conductor members 12 so connected by leads 55 to the different sections of the rheostat 54 that as the column of mercury is forced upwardly through the well, it progressively bridges the leaves 12 to shunt additional sections of the rheostat 54.

In order to control the operation of the switching apparatus 10, an electromagnet comprising a core member 56 and winding 58 and a movable armature member 60 are so associated with the switching apparatus 10 that as the voltage of the generator 48 increases, and consequently the energization of the winding 58 increases pressure on the bellows 40 is decreased to permit the mercury column to fall within the well of the apparatus of Figs. 1 and 2, whereby more of the sections of the rheostat 54 are cut in circuit with the field winding 52 to decrease its energization and consequently decrease the generator voltage. The armature 60 is preferably connected directly to the bellows 40, a spring 61 being provided to actuate the bellows upwardly when the winding 58 is deenergized. Thus, if the voltage output of the generator 48 decreases, the energization of the winding 58 is decreased and the spring 61 actuates the bellows 40 upwardly to effectively force the mercury into the well to progressively bridge the conductor members 12 and thereby progressively shunt additional sections of the rheostat 54 from circuit with the field winding 52, thereby increasing the energization of the field winding 52 and increasing the voltage of the generator 48.

The switching apparatus of this invention is very efficient, only very small movement of the bellows being necessary for effecting a switching operation. Further, a large number of switching operations can be accomplished with very little equipment since the apparatus of this invention contemplates a large number of conductor members in a small space. Further, the apparatus of this invention is capable of carrying relatively large current since the conductor members are in effect heavy terminals. Large conductors may be attached to the conductor members of this apparatus since the leaves are so shaped and staggered that by reversing the conductor members in assembling them, as described hereinbefore there is, in effect, eight rows of terminals obtained which although the conductor members are quite close and can readily be bridged by slight movements of the mercury column, nevertheless gives ample room for connecting or attaching large conductors to the tapered ends of the conducting leaves.

Although this invention has been described with reference to a particular embodiment thereof, it is, of course, not to be limited thereto except insofar as is necessitated by the scope of the appended claims.

I claim as my invention:

1. In a sealed switching apparatus provided with a liquid conducting medium for effecting a switching operation, in combination, a plurality of conductor members disposed in spaced relation, a plurality of insulating spacer members stacked alternately with the conductor members, each of the conductor members and the spacer members having an opening therein aligned to provide a well in the stack for receiving the conducting medium, means associated with the conductor members and the spacer members for holding them alternately assembled, and a bonding material applied to bond the conductor members, spacer members and holding means and provide sealed side walls for the well, the holding means bonded to the conductor members and spacer members rendering the bonded structure resistant to shock.

2. In a sealed switching apparatus provided with a liquid conducting medium for effecting a switching operation, in combination, a plurality of conductor members disposed in spaced relation, a plurality of insulating spacer members stacked alternately with the conductor members, each of the conductor members and the spacer members having an opening therein aligned to provide a well in the stack for receiving the conducting medium, a plurality of elongated members disposed in spaced relation to each other and extending through the conductor members for holding the conductor members and the spacer members in assembled relation, and a bonding material applied to bond the conductor members, spacer members and the spaced elongated members and provided sealed side walls for the well, the elongated members bonded to the conductor members and the spacer members rendering the bonded structure resistant to shock.

3. In a sealed switching apparatus provided with a liquid conducting medium for effecting a switching operation, in combination, a plurality of conductor members disposed in spaced relation, a plurality of insulating spacer members stacked alternately with the conductor members, each of the conductor members and the spacer members having an opening therein aligned to provide a well in the stack for receiving the conducting medium, the spacer members having a predetermined thickness and being smaller in surface area than the conductor members so that when assembled the conductor members project outwardly beyond the edges of the spacer members, a plurality of elongated members disposed in spaced relation about the spacer members and extending through the conductor members, and a bonding material applied to bond the conductor members, spacer members and the elongated members and provide sealed side walls for the well, the elongated members bonded to the conductor members and the spacer members rendering the bonded structure resistant to shock.

4. In a sealed switching apparatus provided with a liquid conducting medium for effecting a switching operation, in combination, a plurality of conductor members disposed in spaced relation, a plurality of insulating spacer members stacked alternately with the conductor members, each of the conductor members and the spacer members having an opening therein aligned to provide a well in the stack for receiving the conducting medium, a plurality of rods disposed in spaced relation to each other and extending through the conductor members for holding the spacer members and conductor members in assembled relation, means associated with each of the rods for insulating them from the conductor members, and a bonding material applied to bond the conductor members, spacer members and rod insulating means into a sealed integral structure, the rod insulating means bonded therein reinforcing the sealed assembly and rendering it resistant to shock.

5. In a sealed switching apparatus provided with a liquid conducting medium for effecting a switching operation, in combination, a plurality of conductor members disposed in spaced relation, the conductor members being composed of an iron base alloy having a nickel plus cobalt content of between 40 to 55% with the cobalt ranging from about 12 to 33%, a plurality of ceramic insulating spacer members stacked alternately with the conductor members, each of the conductor members and spacer members having an opening therein aligned to provide a well in the stack for receiving the conducting medium, means associated with the conductor members and spacer members for holding them alternately assembled, and means comprising a boro-silicate glass having a co-efficient of expansion approximating that of the conductor members applied to bond the conductor members, spacer members and the holding means into a sealed integral structure, the holding means bonded therein reinforcing the sealed assembly and rendering it resistant to shock.

KIRK A. OPLINGER.